United States Patent
Yano

(10) Patent No.: US 10,315,629 B2
(45) Date of Patent: Jun. 11, 2019

(54) DRIVING SYSTEM

(71) Applicant: HONDA MOTOR CO., LTD., Tokyo (JP)

(72) Inventor: Takuji Yano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/893,926

(22) Filed: Feb. 12, 2018

(65) Prior Publication Data

US 2018/0236982 A1   Aug. 23, 2018

(30) Foreign Application Priority Data

Mar. 21, 2017   (JP) .................. 2017-030273

(51) Int. Cl.
| | |
|---|---|
| *B60T 1/00* | (2006.01) |
| *B60K 7/00* | (2006.01) |
| *B60K 17/04* | (2006.01) |
| *B60K 1/02* | (2006.01) |
| *F16D 63/00* | (2006.01) |
| *F16H 63/34* | (2006.01) |

(52) U.S. Cl.
CPC .............. *B60T 1/005* (2013.01); *B60K 1/02* (2013.01); *B60K 7/0007* (2013.01); *B60K 17/043* (2013.01); *B60K 17/046* (2013.01); *F16D 63/006* (2013.01); *B60K 2007/0092* (2013.01); *F16H 63/3425* (2013.01)

(58) Field of Classification Search
CPC ......... B60T 1/005; B60K 1/02; B60K 17/043; B60K 7/0007; B60K 17/046; B60K 2007/0092; F16D 63/006; F16H 63/3425
USPC ....................................................... 180/65.6
See application file for complete search history.

(56) References Cited

U.S. PATENT DOCUMENTS

| | | | | |
|---|---|---|---|---|
| 3,300,001 | A * | 1/1967 | Stockton ................. | B60T 1/005 192/219.5 |
| 8,839,936 | B2 * | 9/2014 | Kim ..................... | F16H 63/3425 188/31 |
| 2006/0037792 | A1 * | 2/2006 | Boss ........................ | B60K 1/02 180/65.6 |

FOREIGN PATENT DOCUMENTS

| | | |
|---|---|---|
| JP | H05-116540 A | 5/1993 |
| JP | 2009-137427 A | 6/2009 |
| JP | 2016-156385 A | 9/2016 |

* cited by examiner

*Primary Examiner* — John D Walters
(74) *Attorney, Agent, or Firm* — Paratus Law Group, PLLC

(57) ABSTRACT

A driving system includes: a left electric motor which drives a left wheel of a vehicle; a first parking gear which is provided on a left power transmission path between the left electric motor and the left wheel; a right electric motor which drives a right wheel of the vehicle; a second parking gear which is provided on a right power transmission path between the right electric motor and the right wheel; and a rotation regulation unit that engages with both of the first parking gear and the second parking gear. The first parking gear and the second parking gear have different tooth tip diameters.

6 Claims, 8 Drawing Sheets

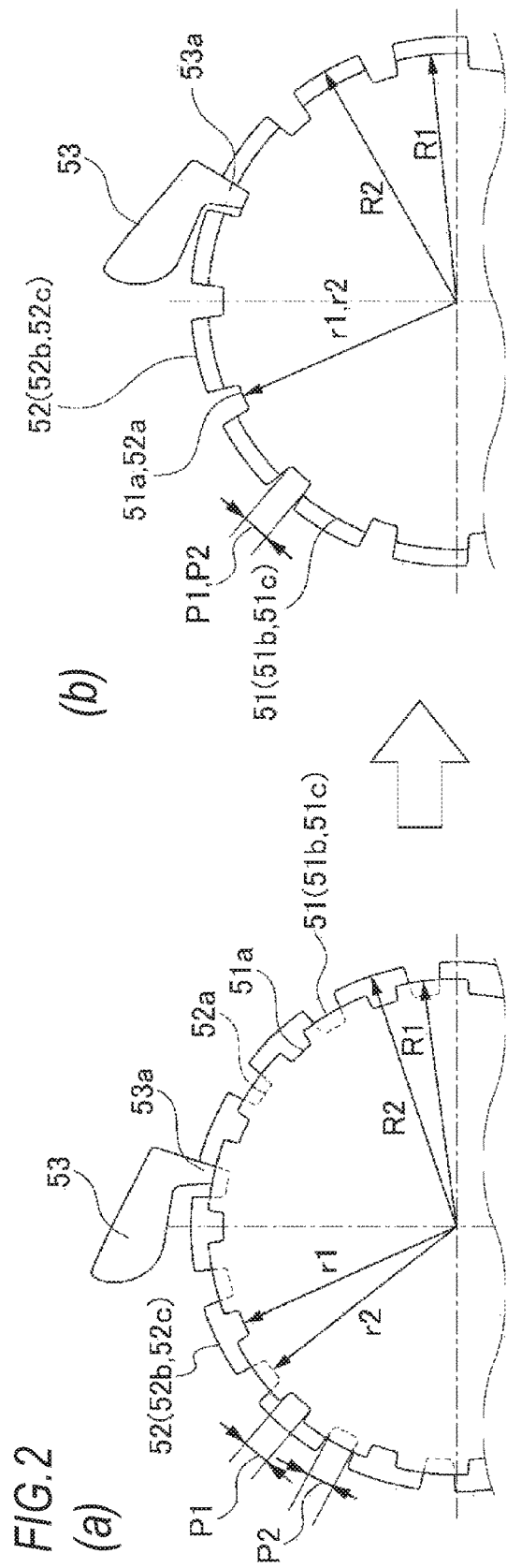

DRIVING SYSTEM

CROSS-REFERENCE TO RELATED APPLICATION(S)

This application claims priority from Japanese Patent Application No. 2017-030273 filed on Feb. 21, 2017, the entire contents of which are incorporated herein by reference.

FIELD

The present invention relates to a driving system provided in a vehicle.

BACKGROUND

In the related art, there is known a parking device which regulates rotation of a driving shaft that drives a wheel to maintain a vehicle in a stopped state when a select lever (shift lever) is selectively operated to a parking range (hereinafter, referred to as a P range). For example, JP-A-05-116540 and JP-A-2009-137427 disclose a parking device of an electric car including: gear-like parking gears which are respectively provided in driving shafts of a driving system that can independently drive left and right wheels; and a parking pawl in which a projected portion that engages with a tooth groove of the parking gears is formed. In the parking device, the projected portion of the parking pawl engages with the tooth groove of the parking gear to regulate the rotation of the driving shaft when a select lever is operated to the P range. Hereinafter, a specific configuration of the driving system described in JP-A-2009-137427 will be described with reference to FIGS. 6 and 7.

As illustrated in FIG. 6, a driving system 100 of JP-A-2009-137427 includes: a left wheel driving system 103A including a first electric motor 101A which drives a left wheel, and a first transmission 102A which is provided on a power transmission path between the first electric motor 101A and the left wheel; a right wheel driving system 103B including a second electric motor 101B which drives a right wheel, and a second transmission 102B which is provided on a power transmission path between the second electric motor 101B and the right wheel; first and second rotation detectors 105A and 105B which are installed on rotor shafts 104A and 104B of each of the electric motors 101A and 101B and detect a rotation angle of each of the rotor shafts 104A and 104B; first and second parking devices 130A and 130B which are installed on each of the rotor shafts 104A and 104B and regulate rotation of each of the rotor shafts 104A and 104B during parking; and a substantially cylindrical case 106 which accommodates these components therein.

As illustrated in FIG. 7, the first and second parking devices 130A and 130B respectively include a parking gear 131, a parking pawl 132, and a parking rod 133. The parking gear 131 has a shape of a gear, and is disposed concentrically to each of the rotor shafts 104A and 104B. A tooth groove 131b which is formed between a tooth 131a and a tooth 131a of the parking gear 131 is configured such that a projected portion 132a of the parking pawl 132 engages therewith.

The parking pawl 132 has the projected portion 132a that engages with the tooth groove 131b at a tip end thereof n addition, a rear end of the parking pawl 132 is rotatably supported by the case 106 via a pawl shaft 134. The pawl shaft 134 is provided with a torsion spring 135 so that a spring load acts in a direction in which engaging between the parking gear 131 and the projected portion 132a of the parking pawl 132 is released. The parking pawl 132 rotates around the pawl shaft 134 by the parking rod 133 when the select lever is selectively operated to the P range.

The parking rod 133 includes a tip end side rod 133a, a rear end side rod 133b, a cam 137, and a coil spring 138. The tip end side rod 133a of the parking rod 133 has a diameter greater than that of the rear end side rod 133b. The tip end side rod 133a is slidably supported by a bracket 136 fixed to the case 106. Meanwhile, on the rear end side rod 133b, the cam 137 for driving the parking pawl 132 is disposed. The cam 137 is slidably provided on the rear end side rod 133b, receives a spring load of the coil spring 138 from the rear part, and abuts against a step 133c formed between the tip end side rod 133a and the rear end side rod 133b. In addition, the rear end side rod 133b is connected to the select lever which is not illustrated at the rear end thereof.

In the above-described first and second parking devices 130A and 130B, when the select lever is selectively operated to the P range, the parking rod 133 moves toward the case 106 side in FIG. 5. When the parking rod 133 moves in this manner, the cam 137 rides on the bracket 136 and pushes up the tip end of the parking pawl 132 from a lower side to an upper side in the drawing. Then, the parking pawl 132 rotates around the pawl shaft 134.

In addition, in a case where the projected portion 132a of the parking pawl 132 abuts against a tooth bottom surface of the tooth groove 131b of the parking gear 131, the projected portion 132a of the parking pawl 132 engages with the tooth groove 131b of the parking gear 131, and thus, the rotation of each of the rotor shafts 104A and 104B is regulated, and the vehicle is maintained in a stopped state.

Meanwhile, in a case where the projected portion 132a of the parking pawl 132 abuts against the tooth tip surface 131c of the parking gear 131, the cam 137 makes the rear end side rod 133b slide toward a side opposite to the case 106 in FIG. 5 against the spring load of the coil spring 138 so as to ensure escape against a stroke of the parking rod 133. Accordingly, it becomes unnecessary for the projected portion 132a of the parking pawl 132 to forcibly press the tip end surface 131c, and this prevents the first and second parking devices 130A and 130B from failing. In a case where the projected portion 132a of the parking pawl 132 abuts against the tooth tip surface 131c in this manner, when the parking gear 131 slightly rotates and the tooth groove 131b of the parking gear 131 comes to a position of the projected portion 132a of the parking pawl 132, the projected portion 132a and the tooth groove 131b engage with each other to regulate the rotation of each of the rotor shafts 104A and 104B, and the vehicle is maintained in a stopped state.

However, in the driving systems of JP-A-05-116540 and JP-A-2009-137427, since two parking devices (parking pawls) are provided, not only there is a concern that the number of components, the costs, the size and the like increase, but also there is a concern that parking effects cannot be sufficiently obtained since there is a case where it is not possible to regulate the rotation of left and right wheels at the same time during a parking operation when phases of the teeth of parking gears of the first and second parking devices are shifted (hereinafter, simply referred to as phases of the left and right parking gears).

Here, the driving system of JP-A-2009-137427 is provided with a phase synchronization unit for synchronizing the phases of the left and right parking gears, and accordingly, it is possible to regulate the rotation of left and right rear wheels at the same time during the parking operation, however, since the phase synchronization unit of JP-A-

2009-137427 makes the phases of the left and right parking gears match each other by using a driving force of the electric motor that drives the wheel, when phase-matching the left and right parking gears, there is a concern that power is generated in the wheels, and thereby deteriorating straight traveling performance of the vehicle. In addition, when the phase matching of the parking gears by the phase synchronization unit of JP-A-2009-137427 is executed in a travel stopped state, there is a concern that the vehicle moves, and thus, there is a restriction that the phase matching cannot be executed unless the vehicle is in the middle of traveling.

Meanwhile, in the parking device described in JP-A-05-116540, since teeth of one parking gear of a pair of parking gears are missing in every other tooth, during a selecting operation to the P range, even in a case where the phases of each of the parking gears are shifted, it is possible to engage the parking gear and the projected portion of the parking pawl with each other, however, when the teeth of one parking gear of the pair of parking gears are missing in every other tooth, the tooth groove of the parking gear widens in a gear circumferential direction, and thus, even in a state where the projected portion of the parking pawl engages with the tooth groove of the parking gear, backlash is generated in a rotational direction of the parking gear. Therefore, there is a concern that one wheel rotates during parking only by an amount that corresponds to the tooth groove widened due to teeth missing, and the vehicle moves.

SUMMARY

The present invention is to provide a driving system which is capable of regulating rotation of two parking gears by one rotation regulation unit, and is capable of reducing a moving distance of a vehicle after an operation of the rotation regulation unit.

The invention provides following Aspects (1) to (6).

(1). A driving system (e.g., a driving system 1 in an embodiment) including:
- a left electric motor (e.g., a first electric motor 2A in an embodiment) which drives a left wheel e.g., a left wheel LW in an embodiment) of a vehicle;
- a first parking gear (e.g., a first parking gear 51 in an embodiment) which is provided on a left power transmission path between the left electric motor and the left wheel;
- a right electric motor (e.g., a second electric motor 2B in an embodiment) which drives a right wheel of the vehicle;
- a second parking gear (e.g., a second parking gear 52 in an embodiment) which is provided on a right power transmission path between the right electric motor and the right wheel; and
- a rotation regulation unit (e.g., a parking pawl 53 in an embodiment) that engages with both of the first parking gear and the second parking gear,
- wherein the first parking gear and the second parking gear have different tooth tip diameters (e.g., tooth tip diameters R1 and R2 in an embodiment).

(2). The driving system according to (1),
wherein the first parking gear and the second parking gear have a same pitch (e.g., pitches P1 and P2 in an embodiment).

(3). The driving system according to (1) or (2),
wherein the first parking gear and the second parking gear have a same tooth bottom diameter (e.g., tooth bottom diameters r1 and r2 in an embodiment).

(4). The driving system according to any one of (1) to (3),
wherein the first parking gear and the second parking gear are disposed to be adjacent to each other.

(5). The driving system according to any one of (1) to (4),
wherein the first parking gear is provided in an output shaft (e.g., an output shaft 21A in an embodiment) of the left electric motor, and
the second parking gear is provided in an output shaft (e.g., an output shaft 21B in an embodiment) of the right electric motor.

(6). The driving system according to any one of (1) to (4),
wherein the first parking gear is provided in an axle (e.g., a left axle 6A in an embodiment) of the left wheel, and
the second parking gear is provided in an axle (e.g., a right axle 6B in an embodiment) of the right wheel.

According to (1), since the rotation of the two parking gears is regulated by one rotation regulation unit, the number of components and the costs can be reduced and the size thereof can be reduced. In addition, since the first parking gear and the second parking gear have different tooth tip diameters, even in a case where the phases are shifted, the two parking gears gradually engage with one rotation regulation unit, and thus, it is possible to reduce the moving distance of the vehicle after the operation of the rotation regulation unit. In other words, compared to a case where the teeth of one parking gear of the pair of parking gears are missing in every other tooth as described in the related art, it is possible to reduce the moving distance of the vehicle until the second parking gear engages with the rotation regulation unit after the first parking gear engages therewith.

According to (2), since the first parking gear and the second parking gear have the same pitch, it is possible to reduce backlash generated between the first parking gear and the second parking gear, and the rotation regulation unit.

According to (3), since the first parking gear and the second parking gear have the same tooth bottom diameter, it is possible to reduce backlash generated between the first parking gear and the second parking gear, and the rotation regulation unit.

According to (4), since the first parking gear and the second parking gear are disposed to be adjacent to each other, the width of the rotation regulation unit can be reduced.

According to (5), since the first parking gear is provided in the output shaft of the left electric motor and the second parking gear is provided in the output shaft of the right electric motor, a force for maintaining the vehicle in a stopped state may be small, and it is possible to further reduce the size of a parking mechanism.

According to (6), since the first parking gear is provided in the axle of the left wheel and the second parking gear is provided in the axle of the right wheel, the rotation of a first parking gear and a second parking gear is regulated at a position closer to the left wheel and the right wheel, it is possible to maintain the stopped state so as not to further cause unnecessary movement of the vehicle.

BRIEF DESCRIPTION OF DRAWINGS

FIG. 2 is an explanatory view illustrating an operation of a parking mechanism according to an embodiment of the invention, wherein (a) is an explanatory view illustrating an operation in a state where a parking pawl engages only with a second parking gear, and (b) is an explanatory view illustrating an operation in a state where the parking pawl engages with a first parking gear and the second parking gear.

FIGS. 3A and 3B are explanatory views illustrating a first modification example of the parking mechanism according to the embodiment of the invention, wherein FIG. 3A is an explanatory view illustrating a first parking gear (small pitch) and a second parking gear (large pitch) which have different pitches in addition to a blade tip diameter, and FIG. 3B is an explanatory view illustrating the first parking gear (large pitch) and the second parking gear (small pitch) which have different pitches in addition to the blade tip diameter.

FIGS. 4A and 4B are explanatory views illustrating a second modification example of the parking mechanism according to the embodiment of the invention, wherein FIG. 4A is an explanatory view illustrating a first parking gear (large tooth bottom diameter) and a second parking gear (small tooth bottom diameter) which have different tooth bottom diameters in addition to a blade end diameter, and FIG. 4B is an explanatory view illustrating the first parking gear (small tooth bottom diameter) and the second parking gear (large tooth bottom diameter) which have different tooth bottom diameters in addition to the blade end diameter.

DETAILED DESCRIPTION

Hereinafter, one embodiment of a driving system of the present r will be described with reference to the attached drawings. In addition, the drawings are to be seen in the sign direction.

[Driving System]

Figure 1:
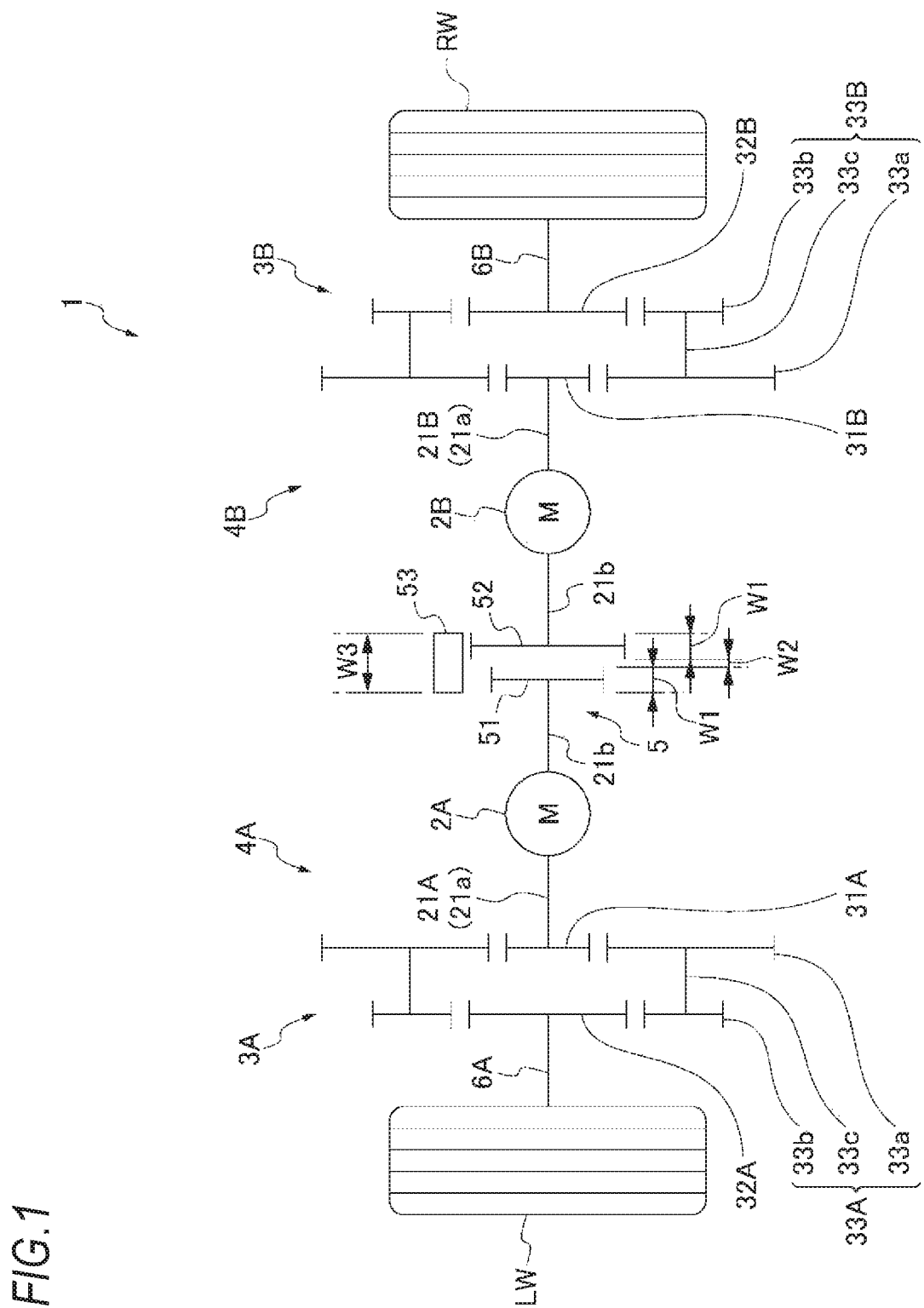
FIG. 1 is a skeleton view of a driving system according to an embodiment of the invention.

As illustrated in FIG. 1, a driving system 1 includes: a left wheel driving system 4A including a first electric motor 2A which drives a left wheel LW of a vehicle, and a first transmission 3A which is provided on a power transmission path between the first electric motor 2A and the left wheel LW; a right wheel driving system 4B including a second electric motor 2B which drives a right wheel RW of the vehicle, and a second transmission 3B which is provided on the power transmission path between the second electric motor 2B and the right wheel RW; and a parking mechanism 5 which regulates rotation of the left wheel LW and the right wheel RW during parking.

[First Electric Motor]

The first electric motor 2A is disposed coaxially to a left axle 6A, and includes an output shaft 21A that outputs a driving force of the left wheel LW. The output shaft 21A includes an outer protrusion portion 21a that protrudes from the first electric motor 2A toward the left wheel LW and an inner protrusion portion 21b that protrudes from the first electric motor 2A toward the right wheel RW, and the first transmission 3A is connected to the outer protrusion portion 21a.

[Second Electric Motor]

The second electric motor 2B is disposed coaxially to a right axle 6B, and includes an output shaft 21B that outputs the driving force of the right wheel RW. The output shaft 21B includes the outer protrusion portion 21a that protrudes from the second electric motor 2B toward the right wheel RW and the inner protruding portion 21b that protrudes from the second electric motor 2B toward the left wheel LW, and the second transmission 3B is connected to the outer protrusion portion 21a.

[First Transmission]

The first transmission 3A includes a first gear 31A provided in the output shaft 21A (outer protrusion portion 21a) of the first electric motor 2A, a second gear 32A provided in the left axle 6A, a plurality of pinion gear 33A which engage with the first gear 31A and the second gear 32A. The pinion gear 33A includes a large-diameter gear 33a which engages with the first gear 31A, a small-diameter gear 33b which engages with the second gear 32A, and a pinion shaft 33c which supports the large-diameter gear 33a and the small-diameter gear 33b integrally rotatably. Accordingly, after deceleration by the first gear 31A, the pinion gear 33A (the large-diameter gear 33a and the small-diameter gear 33b), and the second gear 32A of the first transmission 3A, the driving force output from the output shaft 21A of the first electric motor 2A is transmitted to the left wheel LW via the left axle 6A.

[Second Transmission]

The second transmission 3B includes a first gear 31B provided in the output shaft 21B (outer protrusion portion 21a) of the second electric motor 29, a second gear 32B provided in the right axle 69, and a plurality of pinion gears 33B which engage with the first gear 31B and the second gear 32B. The pinion gear 33B includes a large-diameter gear 33a which engages the first gear 31B, a small-diameter gear 33b which engages with the second gear 32B, and a pinion shaft 33c which supports the large-diameter gear 33a and the small-diameter gear 33b integrally rotatably. Accordingly, after deceleration by the first gear 31B, the pinion gear 33B (the large-diameter gear 33a and the small-diameter gear 33b), and the second gear 32B of the second transmission 3B, the driving force output from the output shaft 21B of the second electric motor 2B is transmitted to the right wheel RW via the right axle 6B.

[Parking Mechanism]

Figure 6:
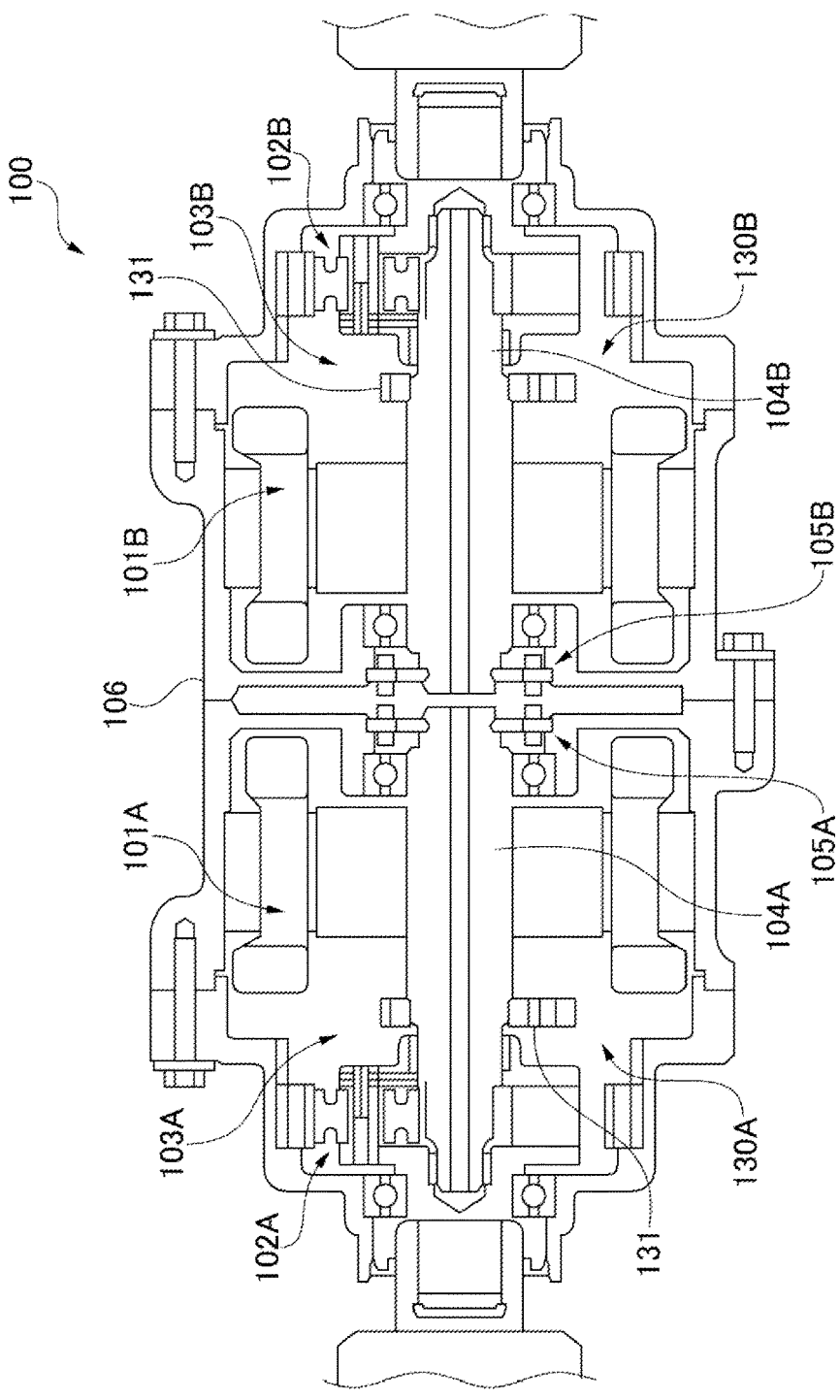
FIG. 6 is a longitudinally sectional view of a driving system described in JP-A-2009-137427.
Figure 7:
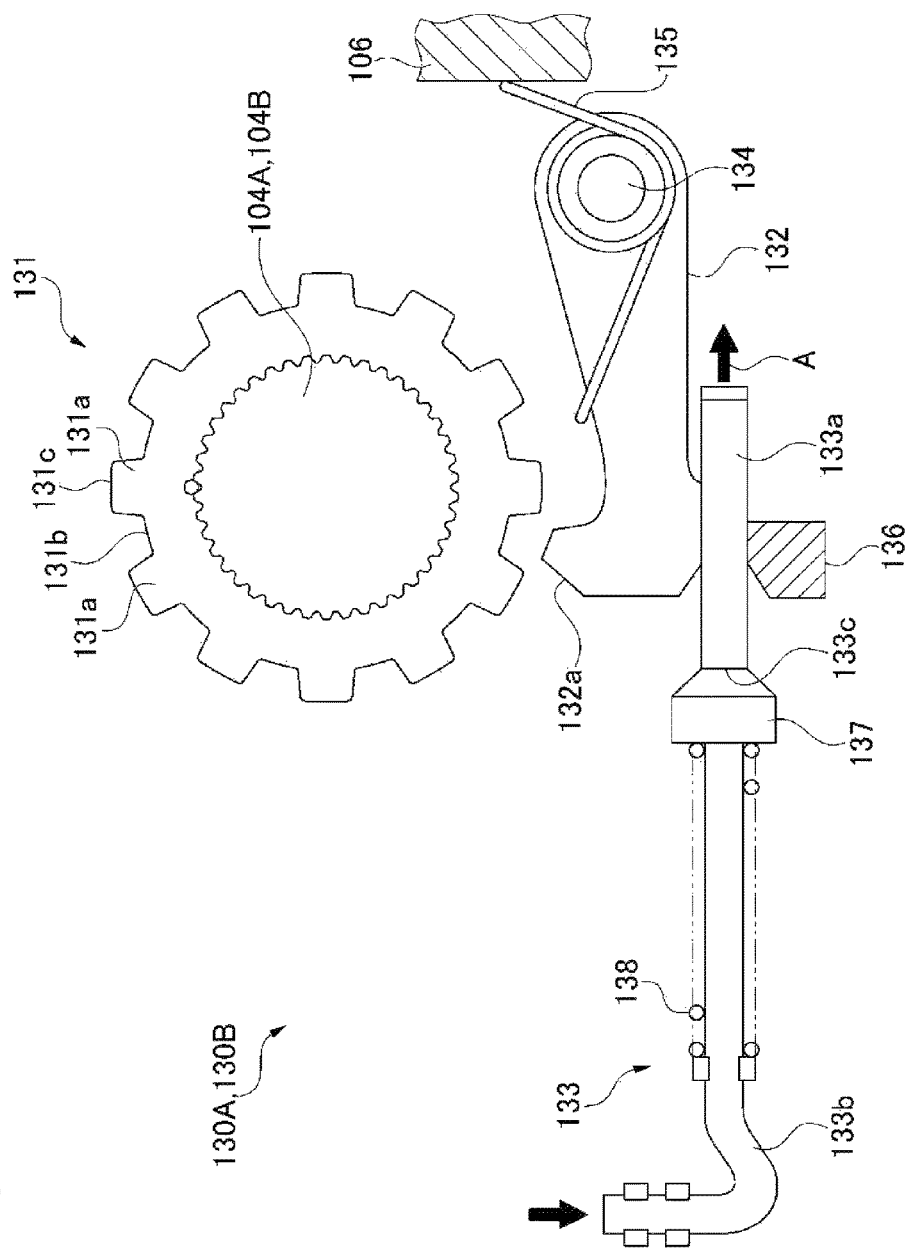
FIG. 7 is a schematic view illustrating a configuration of a parking device described in JP-A-2009-137427.

The parking mechanism 5 has a configuration which includes a first parking gear 51 which is provided on a power transmission path of the left wheel driving system 4A, a second parking gear 52 which is provided on a power transmission path of the right wheel driving system 4B, a parking pawl 53 which engages with the first parking gear 51 and the second parking gear 52, and regulates the rotation of the left wheel LW and the right wheel RW as a projected portion 53a of the parking pawl 53 engages with tooth grooves 51a and 52a of the first parking gear 51 and the second parking gear 52 when a select lever (not illustrated) is operated to the P range. Since the configuration for operating the parking pawl 53 is similar to that of the parking devices 130A and 130B of the related art which are illustrated in FIGS. 6 and 7, the description thereof will be omitted.

The first parking gear 51 and the second parking gear 52 are coaxially disposed to be adjacent to each other, and the parking pawl 53 engages with both the first parking gear 51 and the second parking gear 52. More specifically, the first parking gear 51 and the second parking gear 52 respectively have a predetermined gear width W1, and are disposed to be adjacent to each other in a vehicle width direction via a gap W2 which is smaller than the gear width W1. The parking pawl 53 has a width W3 obtained by adding the gap W2 to the gear width W1+W1 of the first parking gear 51 and the second parking gear 52, and can engage with both of the first parking gear 51 and the second parking gear 52.

According to the parking mechanism 5, since the rotation of the two parking gears 51 and 52 is regulated by one parking pawl 53, it is possible to reduce the number of components and the costs, and to reduce the size. In addition, since the first parking gear 51 and the second parking gear 52 are disposed to be adjacent to each other, the width W3 of the parking pawl 53 can also be reduced.

The first parking gear 51 is provided in the output shaft 21A of the first electric motor 2A, and the second parking gear 52 is provided in the output shaft 21B of the second electric motor 2B. More specifically, the first parking gear 51 is provided in a tip end portion of the inner protrusion portion 21b which protrudes from the first electric motor 2A toward the right wheel RW (the second electric motor 2B) side in the output shaft 21A of the first electric motor 2A, and the second parking gear 52 is provided in a tip end portion of the inner protrusion portion 21b which protrudes from the second electric motor 2B toward the left wheel LW (first electric motor 24) side in the output shaft 21B of the second electric motor 2B.

According to the parking mechanism 5, by regulating the rotation of the first parking gear 51 and the second parking gear 52 on the upstream side of the first transmission 3A and the second transmission 3B, a force for maintaining the vehicle in a stopped state may be small, and it is possible to further reduce the size of the parking mechanism 5.

Here, in the first parking gear 51 and the second parking gear 52, pitches P1 and P2 and tooth bottom diameters r1 and r2 of the teeth 51b and 52b are the same as each other, and the tooth tip diameters R1 and R2 (R1<R2 in the embodiment) are different from each other. In addition, the pitches P1 and P2 are intervals (the widths of the tooth groove 51a and the tooth groove 52a) between the tooth 51b and the tooth 51b and between the tooth 52b and the tooth 52b in the circumferential direction, the tooth bottom diameters r1 and r2 are distances from the shaft center to the bottom portion of the tooth grooves 51a and 52a, and the tooth tip diameters R1 and R2 are distances from the shaft center to the tooth tip surfaces 51c and 52c. Accordingly, even in a case where the phases of the first parking gear 51 and the second parking gear 52 are shifted, as the first parking gear 51 and the second parking gear 52 gradually engage with one parking pawl 53, not only the rotation of the left wheel LW and the right wheel RW can be regulated, but also backlash after the engagement with the parking pawl 53 can be reduced and the moving distance of the vehicle after the parking operation can be reduced. Hereinafter, the operation of the parking mechanism 5 will be described with reference to FIGS. 2A and 2B.

[Operation of Parking Mechanism]

The first parking gear 51 and the second parking gear 52 are in a state where the phases of the teeth 51b and 52b are shifted (refer to (a) of FIG. 2) and in a state where the phases of the teeth 51b and 52b match each other (refer to (b) of FIG. 2).

As illustrated in (a) of FIG. 2, when the select lever is operated to the P range in a state where the phases of the teeth 51b and 52b of the first parking gear 51 and the second parking gear 52 are shifted, the projected portion 53a of the parked pawl 53 does not engage with the tooth grooves 51a and 52a of the first parking gear 51 and the second parking gear 52 at the same time, and abuts against the tooth tip surfaces 51c and 52c of the first parking gear 51 or the second parking gear 52.

(a) of FIG. 2 illustrates a state where the projected portion 53a of the parking pawl 53 abuts against the tooth tip surface 51c of the first parking gear 51 and engages with the tooth groove 52a of the second parking gear 52, and in this state, as the rotation of the second parking gear 52 is regulated by the parking pawl 53, the rotation of the right wheel RW is regulated.

In addition, in a case where the projected portion 53a of the parking pawl 53 abuts against the tooth tip surface 52c of the second parking gear 52, the projected portion 53a of the parking pawl 53 does not engage with the tooth grooves 51a and 52a of any of the first parking gear 51 and the second parking gear and thus, the rotation of the first parking gear 51 and the second parking gear 52 is allowed. However, when the vehicle slightly moves, the state illustrated in (a) of FIG. 2, that is, the state is made where the projected portion 53a of the parking pawl 53 abuts against to the tooth tip surface 51c of the first parking gear 51 and engages with the tooth groove 52a of the second parking gear 52.

In addition, in the state illustrated in (a) of FIG. 2, since the projected portion 53a of the parking pawl 53 engages only with the tooth groove 52a of the second parking gear 52, the rotation of the first parking gear 51 is allowed, but when the left wheel LW slightly moves, the first parking gear 51 rotates, and the projected portion 53a of the parking pawl 53 also engages with the tooth groove 51a of the first parking gear 51 at a timing when the teeth 51b and 52b of the first parking gear 51 and the second parking gear 52 are phase-matched (refer to (b) of FIG. 2). In addition, in a state where the projected portion 53a of the parking pawl 53 engages with the tooth grooves 51a and 52a of the first parking gear 51 and the second parking gear 52, it is possible to regulate the rotation of the first parking gear 51 and the second parking gear 52 in a state where backlash barely exists, and to maintain the vehicle in a stopped state.

As described above, according to the embodiment, since the rotation of the two parking gears 51 and 52 is regulated by one parking pawl 53, it is possible to reduce the number of components and the costs, and to reduce the size. In addition, since the first parking gear 51 and the second parking gear 52 have different tooth tip diameters R1 and R2, even in a case where the phases are shifted, by gradually engaging with one parking pawl 53, the moving distance of the vehicle can be reduced after the operation of the parking pawl 53. In other words, compared to a case where the teeth of one parking gear of one pair of parking gears are missing in every other tooth as illustrated in the related art, after the first parking gear engages, it is possible to reduce the moving distance of the vehicle until the second parking gear engages.

Also, since the first parking gear 51 and the second parking gear 52 have the same pitches P1 and P2 and the same tooth bottom diameters r1 and r2, it is possible to reduce backlash generated between the first parking gear 51 and the second parking gear 52, and the parking pawl 53.

In addition, since the first parking gear 51 and the second parking gear 52 are disposed to be adjacent to each other, the width W3 of the parking pawl 53 can be reduced.

In addition, since the first parking gear 51 is provided in the output shaft 21A of the first electric motor 2A and the second parking gear 52 is provided in the output shaft 21B of the second electric motor 2B, the force for maintaining the vehicle in a stopped state may be small, and it is possible to further reduce the size of a parking mechanism 5.

[Modified Examples of Parking Mechanism]

Next, modification examples of the parking mechanism 5 according to the embodiment of the present invention will be described with reference to FIGS. 3 and 4. However, the configurations common to the above-described embodiment will be given the same reference numerals as those of the above-described embodiment, and thus, the description of the above-described embodiment will be employed.

First Modification Example

Figure 3A:
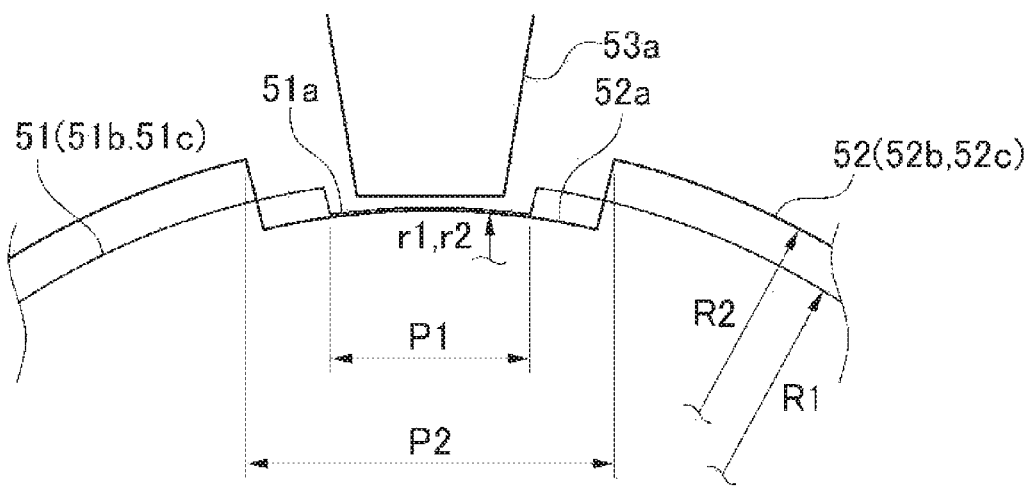
Figure 3B:
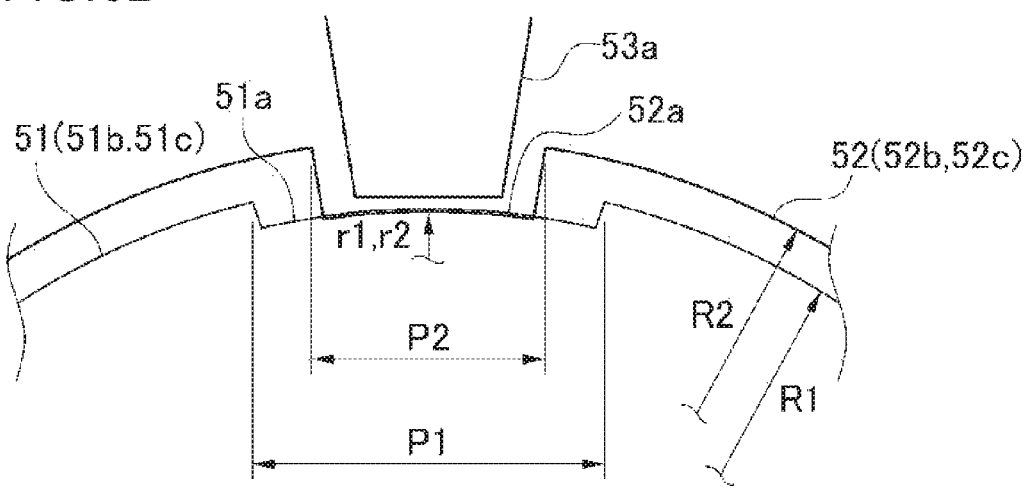

As illustrated in FIGS. 3A and 3B, the parking mechanism 5 according to the first modification example is different from that of the above-described embodiment in that the pitches P1 and P2 of the first parking gear 51 and the second parking gear 52 are different from each other. For example, FIG. 3A illustrates a case where the pitch P2 of the second parking gear 52 is greater than the pitch P1 of the first parking gear 51, and FIG. 3B illustrates a case where the pitch P1 of the first parking gear 51 is greater than the pitch P2 of the second parking gear 52.

Second Modification Example

Figure 4A:
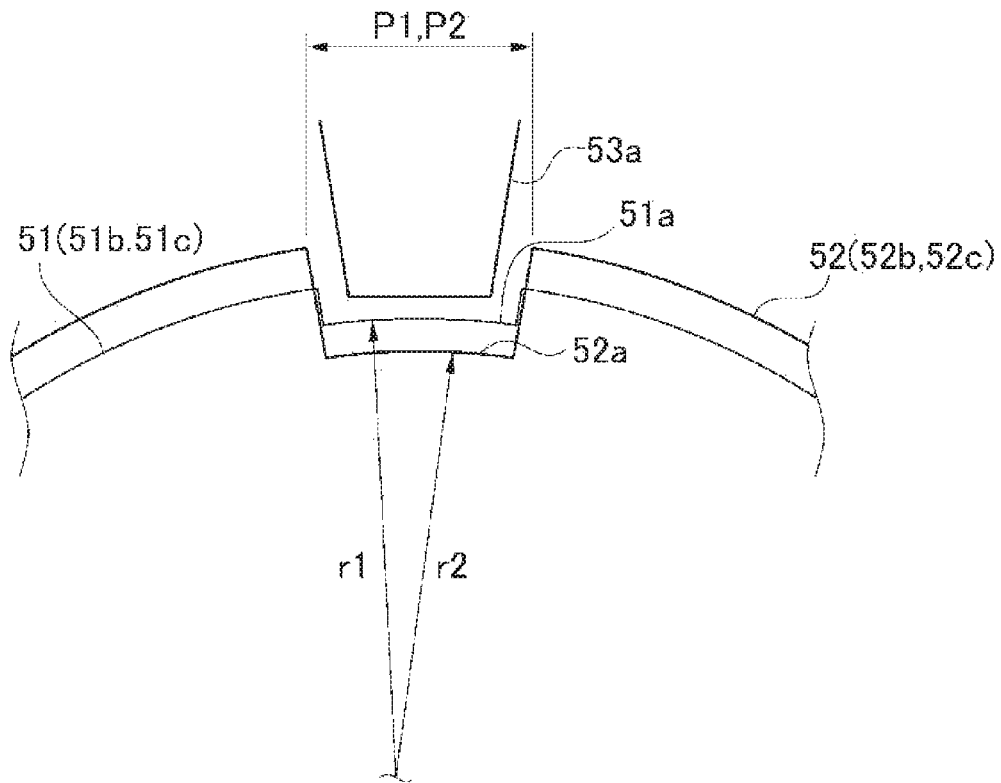
Figure 4B:
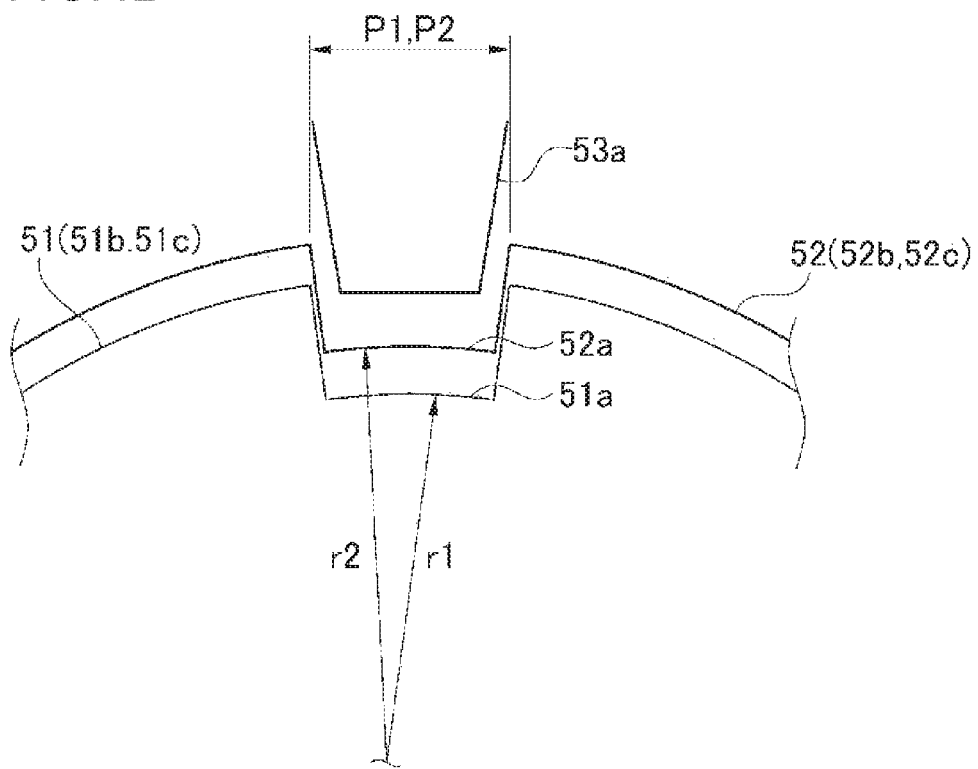

As illustrated in FIGS. 4A and 4B, the parking mechanism 5 according to the second modification example is different from that of the above-described embodiment in that the tooth bottom diameters r1 and r2 of the first parking gear 51 and the second parking gear 52 are different from each other. For example, FIG. 4A illustrates a case where the tooth bottom diameter r1 of the first parking gear 51 is greater than the tooth bottom diameter r2 of the second parking gear 52, and FIG. 4B illustrates a case where the tooth bottom diameter r1 of the first parking gear 51 is greater than the tooth bottom diameter r2 of the second parking gear 52.

In addition, not being limited to the above-described embodiment, deformations, improvements and the like of the present invention can be appropriately employed.

For example, in the above-described embodiment, since the first parking gear 51 and the second parking gear 52 are disposed further on the upstream side than the first transmission 3A and the second transmission 3B with respect to the left wheel LW and the right wheel RW, the force of the parking mechanism 5 for maintaining the vehicle in a stopped state may be small, and it is possible to further reduce the size of the parking mechanism 5, however, the first parking gear 51 and the second parking gear 52 may be disposed further on the downstream side (for example, the left axle 6A and the right axle 6B) than the first transmission 3A and the second transmission 3B. In this case, since the first parking gear 51 and the second parking gear 52 are installed at positions closer to the left wheel LW and the right wheel RW, it is possible to maintain the stopped state so as not to further cause unnecessary movement of the vehicle, in addition, in a case where the first parking gear 51 and the second parking gear 52 are disposed in the first transmission 3A and in the second transmission 3B, both merits can be received.

Figure 5:
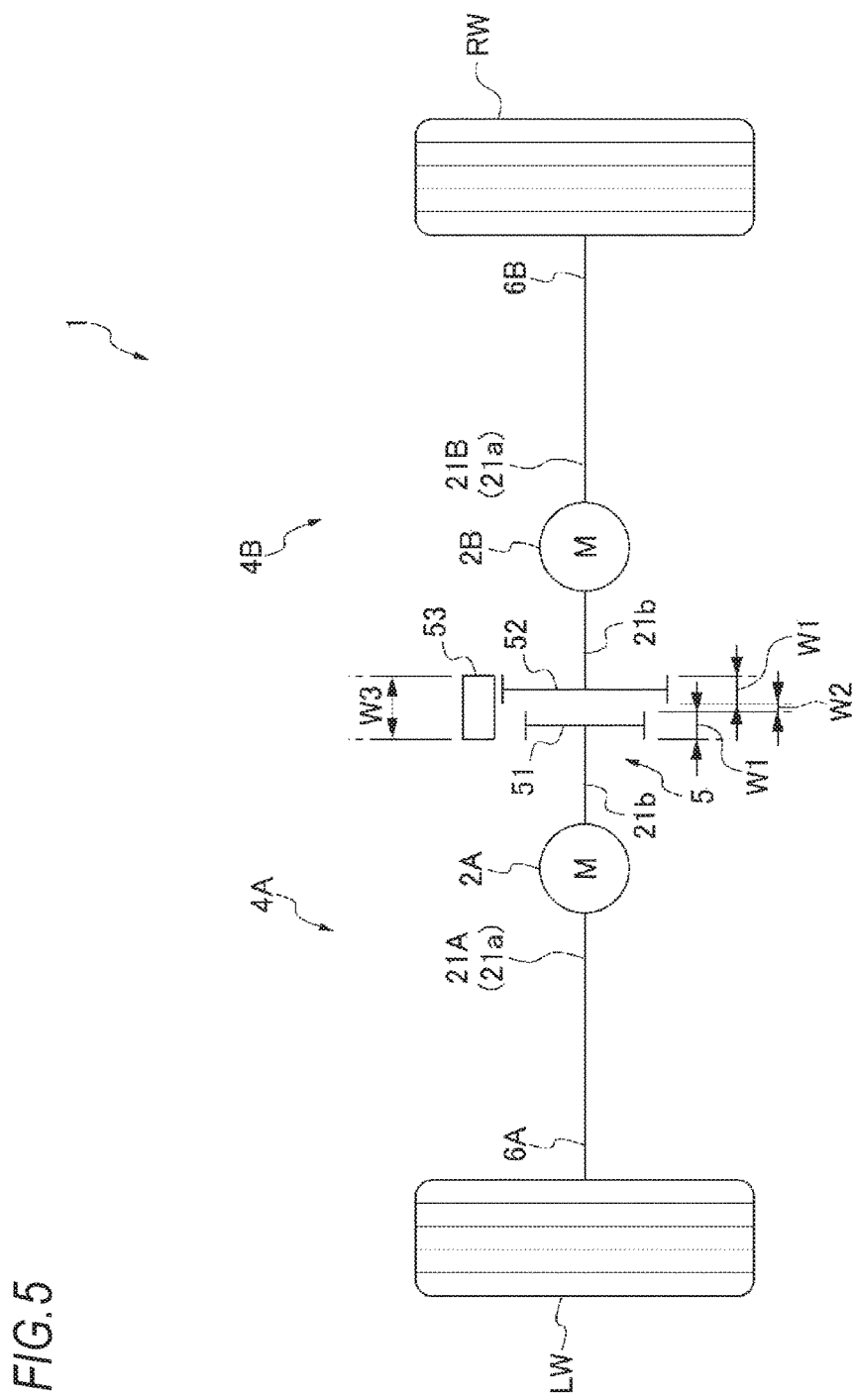
FIG. 5 is a skeleton view of a driving system according to another embodiment of the invention.

In addition, in the above-described embodiment, the driving force of the first electric motor 2A and the second electric motor 2B is transmitted to the left wheel LW and the right wheel RW via the first transmission 3A and the second transmission 3B, but as illustrated in FIG. 5, the present invention can also be realized in the driving system which transmits the driving force of the first electric motor 2A and the second electric motor 2B to the left wheel LW and the right wheel RW not through the first transmission 3A and the second transmission 3B.

Figure 8:
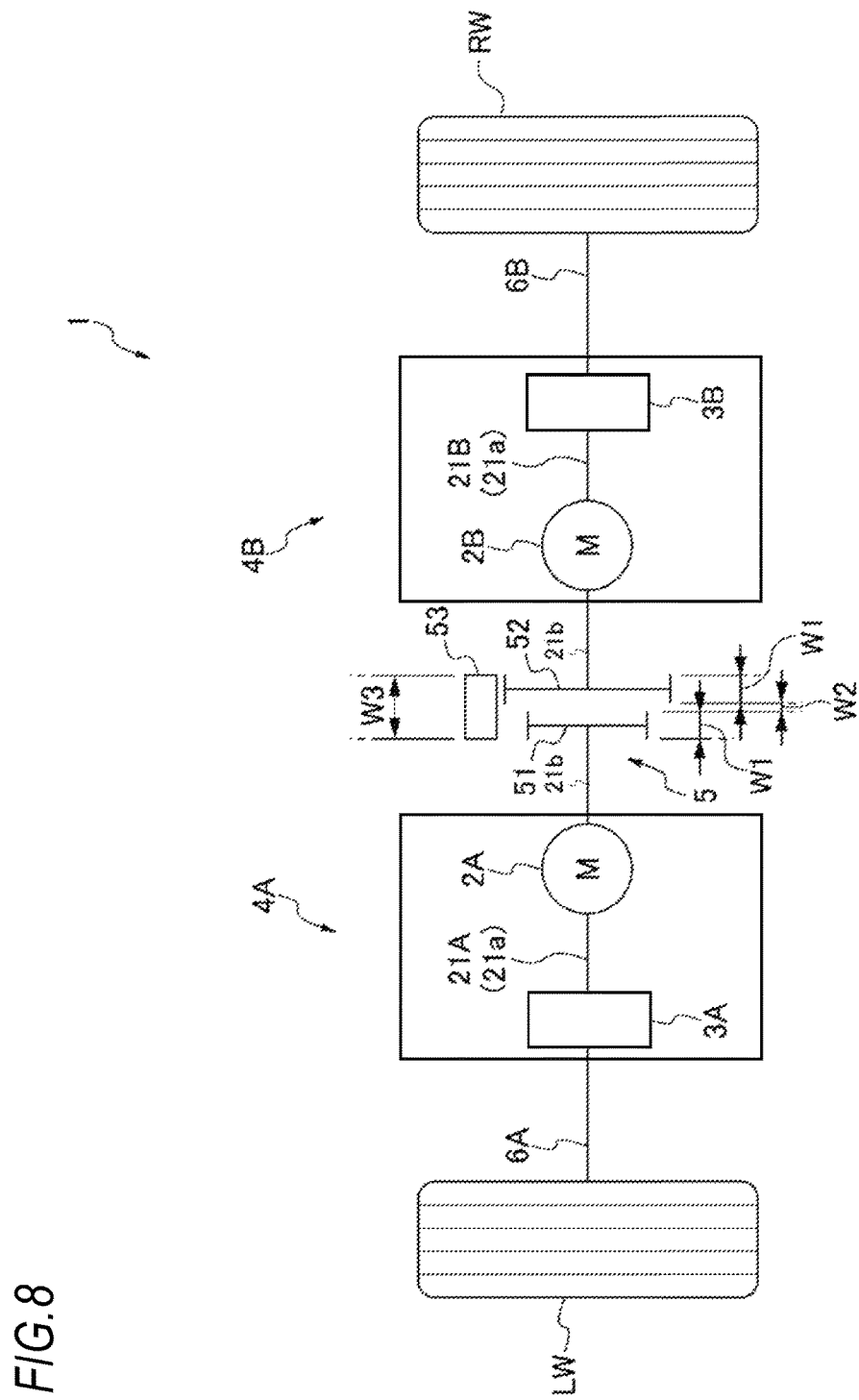
FIG. 8 is a skeleton view of a driving system according to another embodiment of the invention.

As illustrated in FIG. 8, the present invention can also be realized in the driving system which provides the first parking gear 51 in the left axle 6A of the left wheel LW, and provides the second parking gear 52 in the right axle 6B of the right wheel RW.

The invention claimed is:

1. A driving system comprising:
a left electric motor which drives a left wheel of a vehicle;
a first parking gear which is provided on a left rotation element that rotates when power of the left electric motor is transmitted to the left wheel;
a right electric motor which drives a right wheel of the vehicle;
a second parking gear which is provided on a right rotation element that rotates when power of the right electric motor is transmitted to the right wheel; and
a rotation regulation unit that engages with both of the first parking gear and the second parking gear,
wherein the first parking gear and the second parking gear have different tooth tip diameters.

2. The driving system according to claim 1,
wherein the first parking gear and the second parking gear have a same pitch.

3. The driving system according to claim 1,
wherein the first parking gear and the second parking gear have a same tooth bottom diameter.

4. The driving system according to claim 1,
wherein the first parking gear and the second parking gear are disposed to be adjacent to each other.

5. The driving system according to claim 1,
wherein the first parking gear is provided in an output shaft of the left electric motor, and
the second parking gear is provided in an output shaft of the right electric motor.

6. The driving system according to claim 1,
wherein the first parking gear is provided in an axle of the left wheel, and
the second parking gear is provided in an axle of the right wheel.

* * * * *